United States Patent [19]  
Hochreiter et al.

[11] 4,040,070  
[45] Aug. 2, 1977

[54] OPTIMIZED FLASH EXPOSURE
[75] Inventors: William Thomas Hochreiter; Guilford Edwin Kindig, both of Rochester, N.Y.
[73] Assignee: Eastman Kodak Company, Rochester, N.Y.
[21] Appl. No.: 673,514
[22] Filed: Apr. 5, 1976
[51] Int. Cl.² .................. G03B 7/08; G03B 15/04
[52] U.S. Cl. .................................. 354/59; 354/49; 354/126; 354/195
[58] Field of Search .............. 354/42, 49, 59, 126, 354/195, 27, 32, 60 F, 128; 356/225

[56] References Cited
U.S. PATENT DOCUMENTS 3,205,802  9/1965  Wareham .................. 354/60 F X
3,455,218  7/1969  Eagle et al. .................. 354/27

Primary Examiner—John Gonzales
Assistant Examiner—M. L. Gellner
Attorney, Agent, or Firm—T. H. Close

[57] ABSTRACT

A camera adapted to make exposures of a scene illuminated by substantially constant or transient (flash) light includes exposure control apparatus having a photosensor to effect an exposure of duration related to the intensity of the light, a focus control and first and second light attenuating elements mounted to be selectively positioned in and out of the optical path of the photosensor. The attenuating elements are biased to move toward the optical path; and for exposures in substantially constant light, the first attenuating element is held out of the optical path. For exposures in flash light, the first attenuating element is positioned within the optical path while the second attenuating element is moved out of the optical path while the second attenuating element is released to move into the optical path to an extent determined by the focus control.

2 Claims, 4 Drawing Figures

OPTIMIZED FLASH EXPOSURE

BACKGROUND OF THE INVENTION

1. Field of the Invention

This invention relates to control of exposure duration and more particularly to improved apparatus to minimize the difference in exposure times determined by photosensitive exposure control apparatus when illuminated by substantially constant or flash light.

2. Description of the Prior Art

Many camera shutters automatically vary the time interval of exposure in response to substantially constant and transient (flash) light. The flash light output and mechanical movement of the shutter to initiate the exposure are synchronized. Operation of timing apparatus that establishes a time interval of exposure for the shutter is also synchronized with the mechanical movement of the shutter. Generally, the timing apparatus is coupled to the shutter in such a manner that the time interval of exposure determined thereby begins before the shutter actually opens and ends before the shutter actually closes. That is, when the timing apparatus is actuated to begin the time interval there is a delay before the shutter actually opens. Also, at the end of the time interval as determined by the timing apparatus, there is a delay before the shutter actually closes to terminate exposure. If, however, these delays are equal in duration and scene illumination remains fairly constant, proper exposure should result. When photographing a scene illuminated by flash light, the earliest the time interval can be effectively initiated is when light from the flash light output is reflected onto a photosensor that is part of the timing apparatus. To get maximum use of flash light output, the shutter opens before peak light output occurs. Thus, the time interval cannot ordinarily be initiated soon enough before the shutter opens to offset the delay in closing the shutter after the time interval ends. An additional unwanted exposure is created. Although the additional exposure time is small, it is too long in view of the relatively high intensity, and short duration of the flash light. Exposure error results.

It has been suggested that the exposure error can be minimized if the timing apparatus times out faster during exposures illuminated by flash light than during exposures illuminating by substantially constant light. U.S. Pat. No. 3,200,723 discloses exposure control apparatus that uses an R-C time constant circuit comprising a photosensor and capacitro to establish the time interval during exposures in constant or flash light. The R-C circuit develops a threshold voltage into a trigger circuit that controls the closing of the shutter. For exposures illuminated by flash light, the R-C circuit is altered from the configuration used for exposures illuminated by constant light by connecting a fixed value resistor in the R-C circuit. The resistor causes the capacitor to be initially partially precharged. With an initial precharge, the R-C circuit earlier reaches the threshold voltage of the trigger circuit. The time interval is therefore shorter, and the shutter is closed earlier during exposure illuminated by flash light than during exposures illuminated by constant light.

Because the reflected light is a function of subject distance, the amount of overexposure caused by the difference in initiation of exposure and the delay in closing the shutter is also related to subject distance. If additional correction to the exposure time resulting from reflection of light with subject distance is not considered, exposure error will still result.

SUMMARY OF THE INVENTION

In accordance with my invention, a camera adapted to make exposures of a scene illuminated by either substantially constant or transient (flash) light includes exposure control apparatus having a photosensor to effect an exposure of duration related to the intensity of the light, a focus control and first and second light attenuating means mounted to be selectively moved into and out of the optical path of the photosensor. The attenuating means are biased to move toward the optical path of the photosensor, and for exposure in substantially constant light the first attenuating means is positioned in the optical path and the second attenuating means is held out of the optical path. For exposures in flash light, the first attenuating means is moved out of the optical path and the second attenuating means is released to move into the optical path to an extend determined by the focus control.

Preferably a mounting device positions the first attenuating means within the optical path and engages and holds the second attenuating means out of the optical path. A flash unit, when mounted on the camera, moves the first attenuating element out of the optical path. The mounting device for the first attenuating element releases the second attenuating element to move into the optical path. A detent is positionable in the path of movement of the second attenuating element in relation to movement of a focus control. The detent limits the movement of the second attenuating element into the optical path according to the position of the focus control.

BRIEF DESCRIPTION OF THE DRAWINGS

Advantages of the present invention become apparent upon reading the detailed description and upon reference to the drawings, in which.

DETAILED DESCRIPTION OF THE PREFERRED EMBODIMENT

Because photographic cameras are well known, the present description will be directed in particular to elements forming part of, or cooperating more directly wth, the present invention, camera elements not specifically shown or described herein being understood to be selectable from those known in the art.

Figure 1:
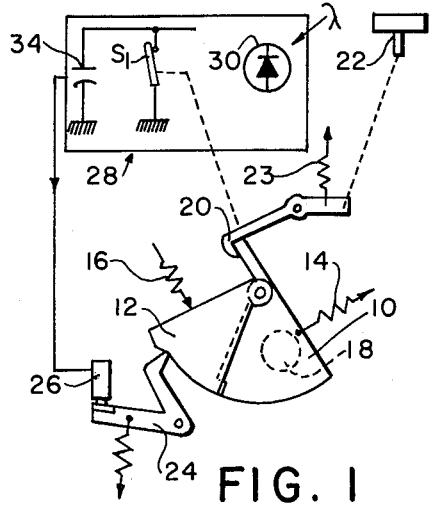
FIG. 1 is a diagrammatic showing of a typical camera exposure control apparatus to which our invention is applicable.

Referring first to FIG. 1, there is shown a schematic representation of an exposure control mechanism with which my invention cooperates. The mechanism includes a shutter comprising blades 10, 12, that are respectively biased by springs 14, 16 to open and close an exposure aperture 18. The blade 10 is latched in its cocked position of FIG. 1 by a latch 20 that is operatively connected with a release mechanism 22 of the camera. A spring 23 biases the latch 20 into its latching position. When the release member 22 is operated, the latch 20 releases the blade 10, and the blade 10 pivots counterclockwise, as viewed in FIG. 1, to open the exposure aperture 18, (this position is not shown). After the blade 10 moves to open, the blade 12 is held in a position to the left of the aperture 18, in which position the aperture 18 is exposed to light. An armature 24, coupled with an electromagnet 26, holds the blade 12 in such position. An electronic circuit 28, including a photosensor 30 exposed to scene brightness, regulates the state of the electromagnet 26 in relation to scene brightness. The electromagnet 26 is initially energized to hold the armature 24 and thus hold the blade 12 in the position shown in FIG. 1. A timing capacitor 34, part of the circuit 28, is charged at a rate depending upon the current in the photosensor 30, the charge rate thus being related to the level of scene brightness. In the event of exposure at high scene brightness, the capacitor 34 charges at a rapid rate; during exposure at a lower scene brightness, the capacitor 34 charges at a correspondingly lower rate. When the capacitor 34 reaches a predetermined charge level, the circuit 28 de-energizes the electromagnet 26; and the armature 24 releases the blade 12 to close. The exposure time (opening and closing of the shutter) is thus related to the level of light striking the photosensor 30. A switch $S_1$ shunts the capacitor 34 to ground prior to the time that the shutter is open. The switch $S_1$ is opened when the blade 10 is opened so that the timing of the shutter is synchronized with the opening of the shutter. Such operation is well known in the art.

Figure 2:
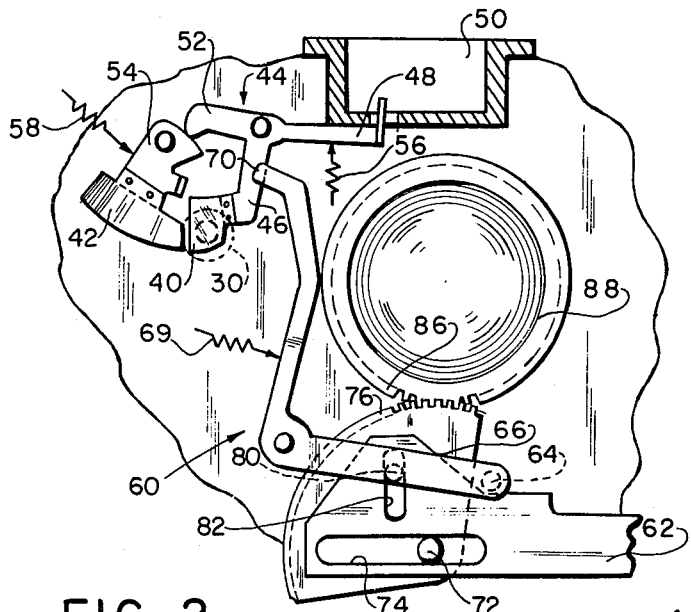
FIG. 2 is a fragmentary view of a camera showing our improved filter control apparatus as it would appear when no flash unit is coupled to the camera.
Figure 3:
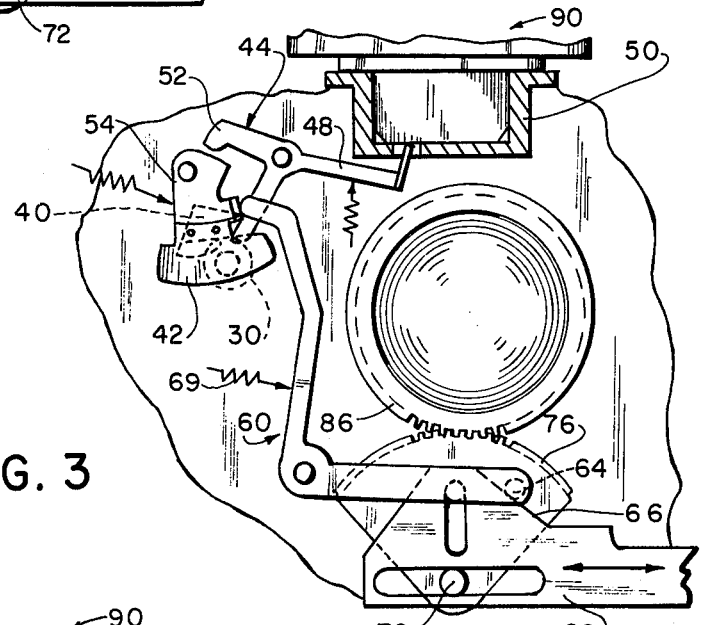
FIG. 3 shows the apparatus of FIG. 2 as it would appear with a flash unit coupled to the camera and with the camera focus adjusted for a medium-range flash exposure.
Figure 4:
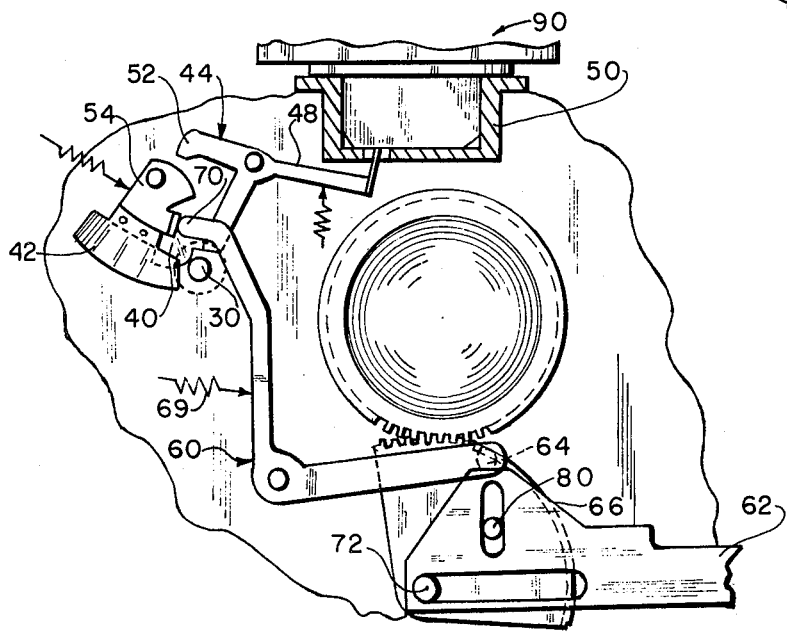
FIG. 4 is similar to FIG. 3 but with the camera set for extreme close-up flash exposure.

A preferred embodiment of my invention, positioned in its normal operating condition for ambient (substantially constant light above a predetermined level) exposure is shown in FIG. 2. The positions of the elements of the apparatus of my invention when exposure is illuminated by flash light are dependent upon subject distance and are illustrated in FIGS. 3 and 4. The apparatus of my invention operates with the automatic exposure control apparatus of FIG. 1 to minimize the difference in exposure times determined thereby when operated in ambient or flash light. The minimization is accomplished in the present invention by selectively positioning first and second light attenuating elements, such as, for example, filters 40, 42 into and out of the optical path of the photosensor 30 depending upon whether exposure is being made in ambient or flash light, and the distance to the photographic subject. The selective positioning of the filters 40, 42 alters the rate of charge of the capacitor 34 to increase or decrease exposure time in relation to reflected light and subject distance during exposure illuminated by flash light.

The filter 40, which may comprise a combination spectral and neutral density filter of substantially constant density, is mounted on a T-mount 44, which operates in the manner of a bellcrank, the filter 40 being mounted on a depending arm 46 an arm 48, generally perpendicular to the arm 46, extends into a flash unit receiving socket 50, and a third arm 52 engages and interlocks with a mount 54 for the filter 42. A spring 56 urges the T-mount 44 counterclockwise, as viewed in FIG. 2, into the position in which the arm 48 engages a wall of the socket 50, the filter 40 is thus held within the optical path of the photosensor 30. The mount 54 is pivotally mounted to structure, partially shown, and positions the filter 42 to one side e.g. the left side in FIG. 2, of the optical path of the photosensor 30. The arm 52 holds the mount 54 in the position of FIG. 1 against the force of a spring 58 which urges the mount 54 counterclockwise, toward a position in which the filter 42 is within the optical path of the photosensor 30. The filter 42 is of variable density such as, for example, a wedge having tapered thickness and is carried by the mount 54 so that the effective density in the optical path will increase the further the filter 48 moves to the right from its FIG. 2 position. Well known formulas relate the optical density of the filter 42 to changes in f/stops of exposure. As seen by the photosensor 30, the change in thickness may, for example, range from approximately zero density when the thinnest or no portion of the filter 42 is within the optical path (corresponding to zero f/stop exposure correction), to 1.0 dnesity when the filter 42 is fully to the right and has its thickest portion within the optical path (corresponding to approximately a three f/stop change in exposure). Thus when the thickest portion of the filter is within the optical path, the capacitor charges at a rate to increase the length of exposure by three f/stops over the exposure obtained when no portion of the filter 42 is within the optical path.

The filter 42 may be selectively positioned along its locus of travel to place a particular thickness in the optical path in relation to focus of the camera. This is accomplished by means of an L-shaped lever 60 that links the position of the filter 42 within the optical path to a setting of a camera focus control 62. The lever 60 is coupled to the focus control 62 by a cam runner 64 on the lever 60 that moves along a cam surface 66 on the focus control 62. A spring 69 biases the lever 60 to a position in which the cam runner 64 engages the cam surface 66, and a head 70 of the lever 60 is moved to various positions relative to the position of the mount 54, each position being related to a subject distance as established by the focus control 62. The further the subject distance, the thicker the wedge portion of the filter 42 placed within the optical path. The focus control 62 is slidably mounted on the structure by means including a post 72 received in a slot 74 of the focus control 62. The post 72 also mounts a sector gear 76 for pivotal motion thereabout. The focus control 62 is also coupled to the sector gear 76 through a pin 80 on the sector gear 76 that is recessed in a slot 82 of the focus control 62. The sector gear 76 engages a toothed section 86 of a lens ring 88, aligned with the aperture 18; through the pin-slot arrangement and gear relationship, the lens ring 88 follows movement of the focus control 62.

During operation of the exposure control apparatus when exposure is illuminated by ambient light, the apparatus of my invention is in the position shown in FIG. 2, the filter 40 being within the optical path of the photosensor 30. When the switch $S_1$ is opened, capacitor 34 charges at a rate that takes into account inertial lags in the shutter; properly timed exposure results. When ambient light decreases to a level requiring flash illumination, a flash unit 90 is inserted into the socket 50 and contacts the arm 46. The T-bar 44 is pivoted clockwise, swinging the filter 40 out of the optical path of the photosensor 30. When the T-bar 44 is swung clockwise, the arm 52 disengages from the mount 54 and the spring 58 moves the mount 54 in a counterclockwise direction. The filter 42 is moved into the opticaL path of the photosensor 30, along a locus of travel to increase the density over the photosensor 30. Referring to FIGS. 3 and 4, there are shown two different settings of the focus control 62 for which the filter 42 occupies different positions within the optical path of the photosensor 30. In FIG. 3, the setting corresponds to, for example, 5 feet on the focus control 62, resulting in the mount 54 moving the filter 42 a predetermined distance into the optical axis, in which a density, for example, equal to 0.15 is placed into the optical path. FIG. 4 shows the focus control 62 at a close-up setting of, for example, 3 or 4 feet in which both filters 40 and 42 are completely outside of the optical path. When the switch $S_1$ is opened, in the one case of the focus control 62 at 5 feet, the filter 42 passes light to the photosensor 30 to cause the capacitor 34 to charge at an intermediate rate that considers the amount of reflected light. The rate of charge is somewhat slower than the extreme close-up condition shown in FIG. 4 (with both filters removed), but faster than the rate of charge when focus control 62 is set at nine feet or beyond, when filter 42 will have interposed a density of 1.0 in the optical path. Thus the charging rate of the capacitor 42 has been altered during exposure illuminated by flash light. The charge rate is now related to reflected light, influenced by subject distance. The unintended exposure is eliminated.

The invention has been described in detail with particular reference to preferred embodiments thereof, but it will be understood that variations and modifications can be effected within the spirit and scope of the invention.

We claim:

1. In a camera having means for mounting a flashunit, a focus control movable between a plurality of positions each indicative of a different distance from a photographic subject and exposure time control apparatus having a photosensor exposed to scene illumination passing along an optical axis of said photosensor, the improvement comprising:

first and second light attenuating means mounted for movement into and out of the optical path of said photosensor;

means for biasing said first and second attenuating means toward said optical path;

means for locating said first attenuating means in said optical path and for holding said second attenuating means out of said optical path;

means, responsive to mounting of a flashunit on said camera, for moving said first attenuating means out of said optical path and for releasing said second attenuating means to move into said optical path; and means, coupled with said focus control, for limiting the extent of movement of said second attenuating means into said optical path in relation to the position of said focus control.

2. Apparatus as claimed in claim 1 wherein said first light attenuating means comprises a filter of substantially constant density and said second attenuating means comprises a filter of nonuniform density.

* * * * *